(12) United States Patent
Kim

(10) Patent No.: US 10,168,504 B2
(45) Date of Patent: Jan. 1, 2019

(54) CAMERA MODULE FOR VEHICLE

(71) Applicant: HYUNDAI MOBIS CO., LTD., Seoul (KR)

(72) Inventor: Ji Seong Kim, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 15/699,671

(22) Filed: Sep. 8, 2017

(65) Prior Publication Data

US 2018/0314028 A1    Nov. 1, 2018

(30) Foreign Application Priority Data

Apr. 26, 2017  (KR) .................. 10-2017-0053273

(51) Int. Cl.
| | | |
|---|---|---|
| *G02B 7/02* | (2006.01) | |
| *C08L 71/00* | (2006.01) | |
| *G02B 1/04* | (2006.01) | |
| *H04N 5/225* | (2006.01) | |

(52) U.S. Cl.
CPC ............... *G02B 7/02* (2013.01); *C08L 71/00* (2013.01); *G02B 1/04* (2013.01); *H04N 5/2253* (2013.01); *H04N 5/2257* (2013.01)

(58) Field of Classification Search
CPC .. G02B 7/02; G02B 1/04; C08L 71/00; H04N 5/2253; H04N 5/2257; H04N 21/414; H04N 21/41422

USPC ....................................... 348/222.1, 370–373
See application file for complete search history.

(56) References Cited

U.S. PATENT DOCUMENTS

| | | | | |
|---|---|---|---|---|
| 2014/0147648 A1* | 5/2014 | Zhamu | ...................... | C30B 5/00 |
| | | | | 428/220 |
| 2017/0341183 A1* | 11/2017 | Buller | .................... | B33Y 30/00 |
| 2018/0040900 A1* | 2/2018 | Zhamu | .................. | H01M 4/667 |

FOREIGN PATENT DOCUMENTS

| | | |
|---|---|---|
| JP | 2000-117834 A | 4/2000 |
| JP | 2008-70791 A | 3/2008 |
| JP | 2011-139305 A | 12/2009 |
| KR | 10-2013-0088251 A | 8/2013 |
| KR | 10-2016-0083520 A | 7/2016 |

\* cited by examiner

*Primary Examiner* — Yogesh Aggarwal
(74) *Attorney, Agent, or Firm* — Knobbe Martens Olson & Bear LLP

(57) ABSTRACT

Disclosed is a camera module for a vehicle. In one embodiment, the camera module for the vehicle comprises: a lens unit comprising one or more lenses; a front body open on one side to accommodate the lens unit; and a rear body bonded with the front body so as to form a space therein, wherein the front body comprises a first composition comprising a dispersion of a first filler comprising graphite, graphene and carbon fiber in a resin matrix comprising one or more of polyamide, polyphenylene sulfide and modified polyphenylene ether.

13 Claims, 2 Drawing Sheets

CAMERA MODULE FOR VEHICLE

CROSS-REFERENCE TO RELATED APPLICATION

The present application claims priority under 35 U.S.C. § 119(a) to Korean application number No. 10-2017-0053273, filed on filed on Apr. 26, 2017, in the Korean Intellectual Property Office, which is incorporated herein by reference in its entirety.

BACKGROUND

1. Technical Field

The present invention relates to a camera module for a vehicle.

2. Related Art

In general, it is very important to create a driver's space to allow the driver to see everywhere around the vehicle during driving and view nearby objects when parking. For this purpose, front-, side- and rear-view cameras are mounted in the vehicle so as to enable the driver to view nearby objects. Particularly, the vehicle's rear-view camera allows the driver to monitor blind spots behind the vehicle through a monitor to thereby prevent an accident from occurring when the vehicle moves in reverse, thereby guaranteeing passenger safety.

Since momentary disruption of such camera modules that are mounted in vehicles can pose a threat to the life of the vehicle's passenger, the reliability and stability of the camera module are the most important requirements. Furthermore, the camera module is required to have high water-tightness together with operational stability under severe cold and hot conditions. Particularly, high-performance camera modules for vehicles, which have one million or more pixels and have recently been mounted, are necessarily required to have heat-dissipation and electromagnetic shielding properties.

For this reason, studies have been actively conducted on materials for camera module elements, which enable vehicle camera modules to have heat-dissipation and water-tightness properties, and on methods for manufacturing camera module assemblies. Meanwhile, in manufacture of camera modules for vehicles, which have one million or more pixels, a front body and rear body made of aluminum are used in order to ensure heat dissipation properties, and for assembly of these bodies, a method employing screws is exclusively used.

When such elements made of aluminum are used, there are problems in that it is difficult to obtain a lightweight camera module product, unlike the use of plastic materials, the production cost increases, the screw assembly method is highly likely to cause wrong assembly or the like, and it is difficult to ensure water-tightness. In addition, such elements made of aluminum have the disadvantage of requiring additional processes, including chromate surface treatment and coating, which reduce productivity.

A prior art related to the present invention is disclosed in Japanese Patent Application Publication No. 2008-070791 (published on Mar. 27, 2008; entitled "Imaging Device").

SUMMARY

One aspect of the present invention is directed to a camera module for a vehicle. In one embodiment, the camera module for the vehicle comprises: a lens unit comprising one or more lenses; a front body open on one side to accommodate the lens unit; and a rear body bonded with the front body so as to form a space therein, wherein the front body comprises a first composition comprising a dispersion of a first filler comprising graphite, graphene and carbon fiber in a resin matrix comprising one or more of polyamide, polyphenylene sulfide and modified polyphenylene ether, wherein the first composition has a thermal conductivity of about 10 W/mK to about 50 W/mK as measured in accordance with ASTM E1461, a surface resistivity of about 1000 Ω/square or less as measured in accordance with IEC 60093, and a specific gravity of about 1.6 to about 2.1 as measured in accordance with ASTM D792.

In one embodiment, the rear body comprises one or more of the first composition and a second composition, wherein the second composition comprises a dispersion of carbon fiber in a resin matrix comprising one or more of polyamide, polyphenylene sulfide and modified polyphenylene ether, and the second composition may have a thermal conductivity of about 1.5 W/mK to about 4.0 W/mK as measured in accordance with ASTM E1461, a surface resistivity of about 100 Ω/square or less as measured in accordance with IEC 60093, and a specific gravity of about 1.04 to about 1.45 as measured in accordance with ASTM D792.

In one embodiment, the first composition and the second composition may have a heat deflection temperature (HDT) of about 200° C. or higher as measured in accordance with ASTM D648, and Izod impact strengths of about 2 kgf·cm/cm to about 5 kgf·cm/cm, and about 5 kgf·cm/cm to about 10 kgf·cm/cm, respectively, as measured in accordance with ASTM D256 using ⅛-inch-thick specimens.

In one embodiment, the first composition may have a tensile strength of about 60 MPa or more as measured in accordance with ASTM D638, a flexural strength of about 80 MPa or more as measured in accordance with ASTM D790, and a flexural modulus of about 13000 MPa or more as measured in accordance with ASTM D790, and the second composition may have a tensile strength of about 200 MPa or more as measured in accordance with ASTM D638, a flexural strength of about 250 MPa or more as measured in accordance with ASTM D790, and a flexural modulus of about 15000 MPa or more as measured in accordance with ASTM D790.

In one embodiment, the first composition may comprise 100 parts by weight of the resin matrix and about 40 parts by weight to about 200 parts by weight of the first filler.

In one embodiment, the first filler may comprise the graphene, the carbon fiber and the graphite at a weight ratio of about 1:5 to 50:10 to 100.

In one embodiment, the graphite may comprise one or more of natural graphite, artificial graphite and expanded graphite, and the graphene may comprise one or more of single-layer graphene and multi-layer graphene.

In one embodiment, the second composition may comprise 100 parts by weight of the resin matrix and about 10 parts by weight to about 100 parts by weight of the carbon fiber.

In one embodiment, the front body and the rear body may be bonded to each other using ultrasonic waves.

In one embodiment, the front body and the rear body may be bonded to each other by exciting them by ultrasonic waves with a frequency of about 20 kHz to about 60 kHz.

In one embodiment, the bonding portion between the front body and the rear body may have a bonding strength of about 20 kgf or more.

In one embodiment, the lens unit may further comprise: a lens portion comprising one or more lenses and configured to pass light therethrough; and a lens holder configured to hold the lens portion.

In one embodiment, the camera module may further comprise: an image sensor configured to convert light, which passed through the lens unit, into an electrical signal; a printed circuit board (PCB) located in the front body and the rear body and mounted with the image sensor; and a connector electrically connected to the PCB so as to supply power to the PCB.

An object of the present invention is to provide a camera module having excellent physical strength and lightweight properties.

Another object of the present invention is to provide a camera module having excellent heat-dissipation, electromagnetic shielding and water-tightness properties.

Still another object of the present invention is to provide a camera module exhibiting excellent economic efficiency and productivity.

The vehicle camera module according to the present invention may have excellent physical strength, excellent lightweight properties, and excellent heat-dissipation, electromagnetic shielding and water-tightness properties, may exhibit excellent economic efficiency, and makes it possible to simplify processes to thereby increase productivity.

DETAILED DESCRIPTION

In the following description, the detailed description of related known technology will be omitted when it may obscure the subject matter of the present invention.

Furthermore, the terms used in the following description are terms defined taking into consideration the functions obtained in accordance with the present invention, and may be changed in accordance with the user's or operator's intention or practice. Accordingly, these terms should be defined based on the overall contents of the specification.

Camera Module for Vehicle

Figure 1:
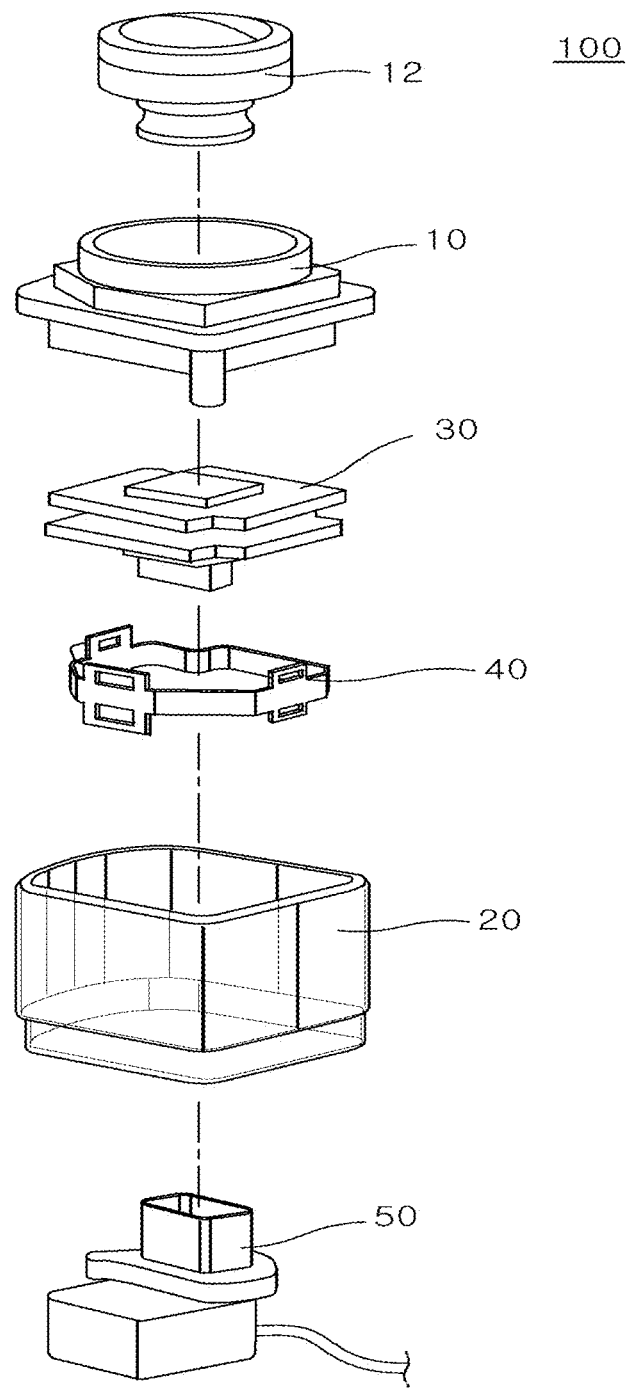
FIG. 1 shows an exploded perspective view of a camera module for a vehicle according to one embodiment of the present invention.

One aspect of the present invention is directed to a camera module for a vehicle. FIG. 1 shows an exploded perspective view of a camera module for a vehicle according to one embodiment of the present invention, and FIG. 2 illustrates a camera module for a vehicle according to one embodiment of the present invention.

Figure 2:
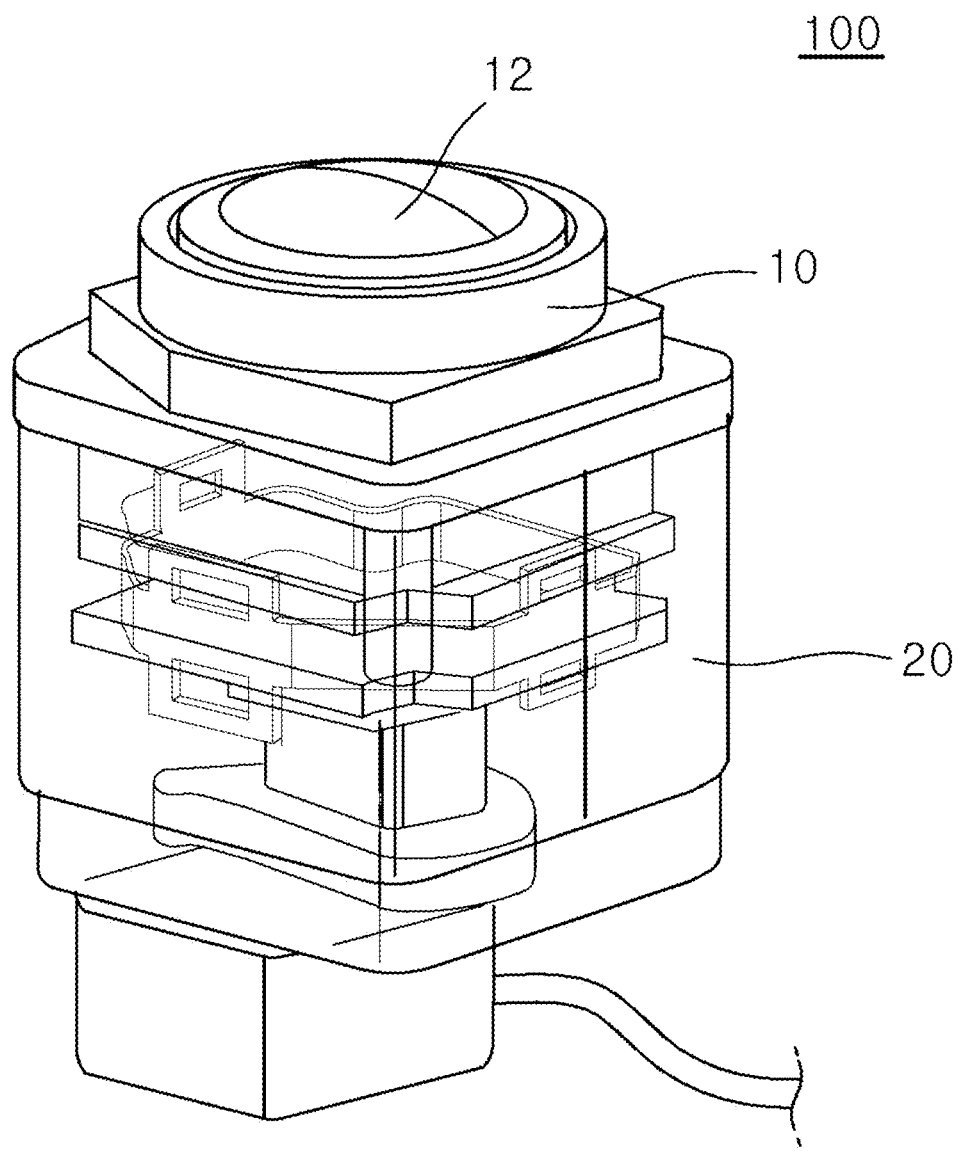
FIG. 2 illustrates a camera module for a vehicle according to one embodiment of the present invention.

Referring to FIGS. 1 and 2, a camera module 100 for a vehicle comprises: a lens unit 12 comprising one or more lenses; a front body 10 open on one side to accommodate the lens unit 12; and a rear body 20 bonded with the front body 10 so as to form a space therein.

In one embodiment, the lens unit 12 further comprises: a lens portion comprising one or more lenses and configured to pass light therethrough; and a lens holder configured to hold the lens portion. In one embodiment, the lenses may be made of one or more of glass and plastic materials.

In one embodiment, the camera module may further comprise: an image sensor configured to convert light, which passed through the lens unit 12, into an electrical signal; a printed circuit board (PCB) 30 located in the front body 10 and the rear body 20 and mounted with the image sensor; and a connector 50 electrically connected to the PCB 30 so as to supply power to the PCB 30.

The image sensor is positioned in such a manner that the optical axis thereof coincides with that of the lens unit 12, so that the image sensor may convert light, which passed through the lens unit 12, into an electrical signal. The PCB 30 may have a plurality of substrates. The plurality of substrates may be electrically connected to each other by a connecting element (not shown).

The connector 50 is connected to a battery by a cable, and may supply power from the battery to the camera module 100.

Referring to FIG. 1, the camera module 100 may further comprise a shield can 40. In one embodiment, the shield can 40 accommodates the PCB 30 and the image sensor, and is disposed in an internal space formed by bonding between the front body 10 and the rear body 20 so as to shield electromagnetic waves that are emitted to the outside.

In one embodiment, the front body comprises a first composition comprising a dispersion of graphene and carbon fiber in a resin matrix comprising one or more of polyamide, polyphenylene sulfide and modified polyphenylene ether.

First Composition

The first composition is one wherein a first filler, comprising graphene, carbon fiber and graphite, is dispersed in a resin matrix comprising one or more of polyamide, polyphenylene sulfide and modified polyphenylene ether.

The resin matrix comprises one or more of polyamide, polyphenylene sulfide and modified polyphenylene ether. When these components are used, the first composition may have excellent mechanical strength, electromagnetic shielding effectiveness and thermal conductivity and, at the same time, may have excellent dimensional stability and formability.

In one embodiment, the modified polyphenylene ether may be prepared by mixing about 50 wt % to about 80 wt % of polyphenylene ether with about 20 wt % to about 50 wt % of one or more of a vinyl aromatic polymer and polyamide 6. When the modified polyphenylene ether prepared under such conditions is used, the first composition may have excellent dimensional stability, impact resistance, mechanical properties, electromagnetic shielding effectiveness and formability. For example, the modified polyphenylene ether may comprise about 65 wt % to about 75 wt % of polyphenylene ether and about 25 wt % to about 35 wt % of polystyrene.

In one embodiment, the vinyl aromatic polymer may comprise one or more of polystyrene, high-impact polystyrene, an acrylonitrile-butadiene-styrene copolymer, polychlorostyrene, and poly(alpha-methylstyrene). For example, the vinyl aromatic polymer may comprise one or more of polystyrene and high-impact polystyrene.

In one embodiment, the graphite may comprise one or more of natural graphite, artificial graphite and expanded graphite. When this kind of graphite is used, the first composition may have excellent heat-dissipation properties. In one embodiment, the graphite may have an average thickness ranging from about 500 nm to about 20 μm. In this thickness range, the first composition may have excellent miscibility, dispersibility and heat-dissipation properties.

The graphene is a two-dimensional material made of $sp^2$-bonded carbon atoms arranged in a honeycomb structure. The graphene may comprise one or more of single-layer graphene and multi-layer graphene. When the first composition comprises the graphene, it may have excellent heat-dissipation properties due to its increased thermal conductivity.

In one embodiment, the graphene may be prepared by mechanical exfoliation from graphite, or exfoliation using a supercritical fluid, or dispersing graphene oxide in a solvent and then reducing the graphene oxide. Alternatively, the graphene may be prepared by chemical vapor deposition from a carbon source.

In one embodiment, the single-layer graphene may have a maximum length of about 1 μm to about 500 μm. The thickness of the single-layer graphene may be about 0.1 nm to about 0.5 nm. In one embodiment, the multi-layer graphene may have a maximum length of about 1 μm to about 500 μm and a thickness of about 0.2 nm to about 500 nm. The multi-layer graphene may be prepared according to any conventional method. For example, the multi-layer graphene may be prepared by supplying a carbon-containing gas onto a heat-treated catalytic metal layer to form graphene layers. In one embodiment, the multi-layer graphene may be formed of 2 to 300 layers.

The carbon fiber is a fibrous carbon material having a fine graphite crystal structure, and may comprise one or more of rayon-based, pitch-based and PAN-based carbon fibers.

The carbon fiber that is used in the present invention may have a diameter of about 1 μm to about 25 μm and a maximum length of about 100 μm to about 10 mm. When the carbon fiber satisfying such conditions is used, the first composition may have increased mechanical strength and excellent miscibility and formability. In one embodiment, the carbon fiber may have a spherical, lamellar or polygonal cross-sectional shape.

In one embodiment, the graphite, graphene and carbon fiber may have a carbon content of about 95 wt % or more. For example, they may have a carbon content of about 98 wt % to 100 wt %. If the carbon content is about less than 95 wt %, the first composition may have low electrical conductivity and thermal conductivity, and thus the surface resistivity and thermal conductivity of the camera module element may be reduced and the electromagnetic shielding effectiveness and heat-dissipation properties thereof may also be reduced.

In one embodiment, the first composition may comprise 100 parts by weight of the resin matrix and about 40 parts by weight to about 200 parts by weight of the first filler. In such content ranges, the first composition may have excellent mechanical properties, heat-dissipation properties and electromagnetic shielding properties. For example, the first composition may comprise 100 parts by weight of the resin matrix and about 40, 45, 50, 55, 60, 65, 70, 75, 100 or 200 parts by weight of the first filler.

In one embodiment, the first filler may comprise the graphene, the carbon fiber and the graphite at a weight ratio of about 1:5 to 50:10 to 100. At this weight ratio, the first composition may have excellent mechanical properties, electromagnetic shielding effectiveness and thermal conductivity. For example, the first filler may comprise the graphene, the carbon fiber and the graphite at a weight ratio of about 1:5 to 25:25 to 60. As another example, the first filler may comprise the graphene, the carbon fiber and the graphite at a weight ratio of about 1:10:40.

When the front body is made of the first composition, it may have excellent electrical conductivity and thermal conductivity, and thus may have excellent electromagnetic shielding properties and heat-dissipation properties.

In one embodiment, the first composition has a thermal conductivity of about 10 W/mK to about 50 W/mK as measured in accordance with ASTM E1461, a surface resistivity of about 1000 Ω/square or less as measured in accordance with IEC 60093, and a specific gravity of about 1.6 to about 2.1 as measured in accordance with ASTM D792. For example, the first composition may have a thermal conductivity of about 15 W/mK to about 30 W/mK as measured in accordance with ASTM E1461, a surface resistivity of about $10^{-3}$ Ω/square to about 100 Ω/square as measured in accordance with IEC 60093, and a specific gravity of about 1.6 to about 2.1 as measured in accordance with ASTM D792.

In one embodiment, the first composition may have a heat deflection temperature (HDT/A) of about 200° C. or higher as measured in accordance with ASTM D648 at a load of 1.82 MPa. For example, the heat deflection temperature may range from about 200° C. to about 350° C.

In one embodiment, the first composition may have an Izod impact resistance of about 2 kgf·cm/cm to about 5 kgf·cm/cm as measured in accordance with ASTM D256 using a ⅛-inch-thick specimen.

In one embodiment, the first composition may have a tensile strength of about 60 MPa or more as measured in accordance with ASTM D638 at room temperature (23° C.), a flexural strength of about 80 MPa or more as measured in accordance with ASTM D790, and a flexural modulus of about 13000 MPa or more as measured in accordance with ASTM D790. For example, the first composition may have a tensile strength of about 80 MPa to about 200 MPa as measured in accordance with ASTM D638, a flexural strength of about 100 MPa to about 300 MPa as measured in accordance with ASTM D790, and a flexural modulus of about 13000 MPa to about 18000 MPa as measured in accordance with ASTM D790.

Second Composition

In one embodiment, the second composition may be one wherein carbon fiber is dispersed in a resin matrix comprising one or more of polyamide, polyphenylene sulfide and modified polyphenylene ether. The resin matrix and the carbon fiber may be used under the same conditions as described above, and thus the detailed description thereof is omitted.

In one embodiment, the second composition may comprise about 100 parts by weight of the resin matrix and about 1 part by weight to about 100 parts by weight of the carbon fiber. When the second composition comprises the resin matrix and the carbon fiber in the above-described amounts, it may have excellent dimensional stability, impact resistance, mechanical properties, electromagnetic shielding properties and formability.

For example, the second composition may comprise 100 parts by weight of the resin matrix and about 1, 5, 10, 15, 20, 25, 30, 35, 40, 45, 50, 55, 60, 65, 70, 75, 80, 85, 90, 95 or 100 parts by weight of the carbon fiber.

In one embodiment, the second composition may have a thermal conductivity of about 1.5 W/mK to about 4.0 W/mK as measured in accordance with ASTM E1461, a surface resistivity of about 100 Ω/square or less as measured in accordance with IEC 60093, and a specific gravity of about 1.04 to about 1.45 as measured in accordance with ASTM D792. For example, the second composition may have a thermal conductivity of about 1.8 W/mK to about 3.5 W/mK as measured in accordance with ASTM E1461, a surface resistivity of about $10^{-3}$ Ω/square to about $10^2$ Ω/sq as measured in accordance with IEC 60093, and a specific gravity of about 1.05 to about 1.35 as measured in accordance with ASTM D792.

In one embodiment, the second composition may have a heat deflection temperature (HDT) of about 200° C. or higher as measured in accordance with ASTM D648. For example, the heat deflection temperature may range from 250° C. to about 350° C.

In one embodiment, the second composition may have an Izod impact resistance of about 5 kgf·cm/cm to about 10 kgf·cm/cm as measured in accordance with ASTM D256 using a ⅛-inch specimen.

In one embodiment, the second composition may have a tensile strength of about 200 MPa or more as measured in accordance with ASTM D638, a flexural strength of about 250 MPa or more as measured in accordance with ASTM D790, and a flexural modulus of about 15000 MPa or more as measured in accordance with ASTM D638. For example, the second composition may have a tensile strength of about 200 MPa to about 350 MPa as measured in accordance with ASTM D638, a flexural strength of about 250 MPa to about 400 MPa as measured in accordance with ASTM D790, and a flexural modulus of about 15000 MPa to about 25000 MPa as measured in accordance with ASTM D790.

In one embodiment, the front body and the rear body may be made of the first composition. In this case, the heat-dissipation properties of the camera module may be maximized. In another embodiment, the front body may be made of the first composition, and the rear body may be made of the second composition. In this case, the camera module may have excellent heat-dissipation properties, electromagnetic shielding properties and mechanical properties.

In one embodiment, the front body and the rear body may be bonded to each other using ultrasonic waves. For example, the front body and the rear body may be bonded to each other by bringing portions to be bonded into contact with each other, and then melt-bonding these portions by ultrasonic wave excitation.

In one embodiment, the portions to be bonded may be excited by ultrasonic waves with a frequency of about 20 kHz to about 60 kHz and a power of about 50 W to about 200 W. Under such conditions, the portions may be effectively bonded to each other. For example, the portions to be bonded may be excited by ultrasonic waves with a frequency of about 20, 25, 30, 35, 40, 45, 50, 55 or 60 kHz. For example, the portions to be bonded may be excited by ultrasonic waves with a power of about 50, 60, 70, 80, 90, 100, 150 or 200 W.

As used herein, the term "portions to be bonded" means surfaces that come into contact with each other in order to bond the front body to the rear body. When the front body and the rear body are bonded to each other using ultrasonic waves as described above, the camera module may have excellent water-tightness, and processes can be simplified, suggesting that the camera module may exhibit excellent productivity and economic efficiency.

In one embodiment, the bonding portion between the front body and the rear body may have a bonding strength of about 20 kgf or more. For example, the bonding strength may be about 20 kgf to about 100 kgf.

The vehicle camera module according to the present invention can exhibit excellent physical properties, and does not comprise conventional aluminum bodies, suggesting that it has excellent lightweight properties. Furthermore, the camera module according to the present invention has excellent heat-dissipation properties due to its high thermal conductivity, exhibits excellent electromagnetic shielding properties, and has excellent water-tightness due to bonding performed using ultrasonic waves. In addition, the camera module according to the present invention makes it possible to save the metal die casting and surface treatment costs that are incurred when conventional aluminum bodies are used, suggesting that the camera module is highly cost effective. Additionally, the camera module according to the present invention may exhibit excellent productivity, because it makes it possible to simplify processes.

Hereinafter, preferred examples of the present invention will be described in further detail. It is to be understood, however, that these examples are for illustrative purposes only and are not intended to limit the scope of the present invention in any way.

The contents not described herein can be readily envisioned by those skilled in the art, and thus the description thereof is omitted.

EXAMPLES AND COMPARATIVE EXAMPLES (a) First Composition:
As a resin matrix, a modified polyphenylene ether comprising 70 wt % of polyphenylene ether and 30 wt % of polystyrene was prepared, and as a first filler, graphene, carbon fiber and graphite were prepared at a weight ratio of 1:10:40. 50 Parts by weight of the first filler was uniformly dispersed in 100 parts by weight of the resin matrix, thereby preparing a first composition.

(b) Second Composition:
As a resin matrix, a modified polyphenylene ether comprising 70 wt % of polyphenylene ether and 30 wt % of polystyrene was prepared. 30 Parts by weight of carbon fiber was uniformly dispersed in 100 parts by weight of the resin matrix, thereby preparing a second composition.

(c) Third Composition:
A modified polyphenylene ether comprising 70 wt % of polyphenylene ether and 30 wt % of polystyrene was prepared.

Example 1

As shown in FIG. 1, a lens unit, comprising a lens portion one or more lenses and configured to pass light therethrough and a lens holder configured to hold the lens portion, was received in a front body formed using the first composition. Next, an image sensor to be positioned such that the optical axis thereof would coincide with that of the lens unit, a PCB to be mounted with the image sensor, a shield can to be mounted with the PCB, and a connector electrically connected to the PCB so as to supply power to the PCB, were sequentially combined with the front body. Then, the front body was combined with a rear body formed using the second composition, and the portions to be bonded of the front body and the rear body were melt-bonded to each other by exciting them by ultrasonic waves with a frequency of 40 kHz and a power of 100 W for 0.3 seconds, thereby manufacturing a camera module. The bonding strength between the front body and the rear body was 35 kgf.

Example 2

A camera module was manufactured in the same manner as described in Example 1, except that a front body formed using the first composition and a rear body formed using the first composition were used. The bonding strength between the front body and the rear body was 21 kgf.

Example 3

A camera module was manufactured in the same manner as described in Example 1, except that a front body formed using the first composition and a rear body formed using the third composition were used. The bonding strength between the front body and the rear body was 22 kgf.

Comparative Example

A camera module was manufactured in the same manner as described in Example 1, except that a front body was formed using the third composition. The bonding strength between the front body and the rear body was 20 kgf.

Evaluation of Physical Properties

The physical properties of the first, second and third compositions were measured in the following manner. Furthermore, for each of the camera modules manufactured in Examples 1 to 3 and the Comparative Examples, a thermocouple was attached to the center of the image sensor under a condition where the temperature outside each camera module was 75° C. Next, each camera module was operated by applying power, and in this state, the temperature of the image sensor was measured using a data logger (Ahlborn, Germany) for 4 hours. The image sensor temperature at thermal equilibrium is shown in Table 2 below.

(1) Thermal conductivity (W/mK): measured (in plane) in accordance with ASTM E1461.

(2) Surface resistivity ($\Omega$/square): measured in accordance with IEC 60093.

(3) Specific gravity: measured in accordance with ASTM D792.

(4) Heat deflection temperature (° C.): measured in accordance with ASTM D648.

(5) Izod impact strength (kgf·cm/cm): measured in accordance with ASTM D256 using a ⅛-inch-thick sample at room temperature.

(6) Tensile strength (MPa): measured in accordance with ASTM D638.

(7) Flexural strength (MPa) and flexural modulus (MPa): measured in accordance with ASTM D790.

(8) Electromagnetic shielding effectiveness (dB, 100 MHz): measured in accordance with ASTM D4935.

TABLE 1

| Properties | First composition | Second composition | Third composition |
|---|---|---|---|
| Thermal conductivity (W/nnK) | 25 | 2.5 | 0.25 |
| Surface resistivity ($\Omega$/square) | 80 | 2 | $10^{14}$ |
| Specific gravity | 1.65 | 1.30 | 1.1 |
| Heat deflection temperature (° C.) | 210 | 210 | 95 |
| Izod impact strength (kgf · cm/cm) | 3.5 | 8.2 | 13 |
| Tensile strength (MPa) | 90 | 220 | 50 |
| Flexural strength (MPa) | 120 | 290 | 90 |
| Flexural modulus (MPa) | 24000 | 18000 | 2500 |
| Electromagnetic shielding effectiveness (dB, 100 MHz) | 35 | 60 | 3 or less |

TABLE 2

| | Example 1 | Example 2 | Example 3 | Comparative Example |
|---|---|---|---|---|
| Image sensor temperature (° C.) | 121 | 118 | 123 | 145 |

As can be seen in the measurement results shown in Tables 1 and 2 above, when the front body was formed using the first composition as described in Examples 1 to 3 of the present invention, the front body exhibited excellent heat-dissipation properties due to its high thermal conductivity, and thus the image sensor temperature could be maintained at a low level. Furthermore, in this case, the front body had excellent electromagnetic shielding properties. Particularly, it could be seen that, when the front body formed using the first composition and the rear body formed using the second composition, as described in Example 1, were used, the camera module could exhibit high water-tightness, high mechanical strength, high electromagnetic shielding effectiveness and excellent heat-dissipation properties.

In addition, as can be seen in Tables 1 and 2 above, in the case of the Comparative Example in which the front and rear bodies formed using the first and second compositions according to the present invention were not used, the camera module had poor heat-dissipation properties due to its poor thermal conductivity, and exhibited low electromagnetic shielding effectiveness due to its low surface resistivity.

While various embodiments have been described above, it will be understood to those skilled in the art that the embodiments described are by way of example only. Accordingly, the vehicle camera module described herein should not be limited based on the described embodiments.

What is claimed is:

1. A camera module for a vehicle, comprising:
   a lens unit comprising one or more lenses;
   a front body open on one side to accommodate the lens unit; and
   a rear body bonded with the front body so as to form a space therein,
   wherein the front body comprises a first composition comprising a dispersion of a first filler comprising graphite, graphene and carbon fiber in a resin matrix comprising one or more of polyamide, polyphenylene sulfide and modified polyphenylene ether,
   wherein the first composition has a thermal conductivity of about 10 W/mK to about 50 W/mK as measured in accordance with ASTM E1461, a surface resistivity of about 1000 $\Omega$/square or less as measured in accordance with IEC 60093, and a specific gravity of about 1.6 to about 2.1 as measured in accordance with ASTM D792.

2. The camera module of claim 1, wherein the rear body comprises one or more of the first composition and a second composition,
   wherein the second composition comprises a dispersion of carbon fiber in a resin matrix comprising one or more of polyamide, polyphenylene sulfide and modified polyphenylene ether, and
   the second composition has a thermal conductivity of about 1.5 W/mK to about 4.0 W/mK as measured in accordance with ASTM E1461, a surface resistivity of about 100 $\Omega$/square or less as measured in accordance with IEC 60093, and a specific gravity of about 1.04 to about 1.45 as measured in accordance with ASTM D792.

3. The camera module of claim 2, wherein the first composition and the second composition have a heat deflection temperature (HDT) of about 200° C. or higher as measured in accordance with ASTM D648, and Izod impact strengths of about 2 kgf·cm/cm to about 5 kgf·cm/cm, and about 5 kgf·cm/cm to about 10 kgf·cm/cm, respectively, as measured in accordance with ASTM D256 using ⅛-inch-thick specimens.

4. The camera module of claim 2, wherein the first composition has a tensile strength of about 60 MPa or more as measured in accordance with ASTM D638, a flexural strength of about 80 MPa or more as measured in accordance with ASTM D790, and a flexural modulus of about 13000 MPa or more as measured in accordance with ASTM D790, and the second composition may have a tensile strength of about 200 MPa or more as measured in accordance with ASTM D638, a flexural strength of about 250 MPa or more as measured in accordance with ASTM D790, and a flexural modulus of about 15000 MPa or more as measured in accordance with ASTM D790.

5. The camera module of claim 1, wherein the first composition comprises 100 parts by weight of the resin matrix and about 40 parts by weight to about 200 parts by weight of the first filler.

6. The camera module of claim 1, wherein the graphite comprises one or more of natural graphite, artificial graphite and expanded graphite, and
the graphene comprises one or more of single-layer graphene and multi-layer graphene.

7. The camera module of claim 1, wherein the first filler comprises the graphene, the carbon fiber and the graphite at a weight ratio of about 1:5 to 50:10 to 100.

8. The camera module of claim 2, wherein the second composition comprises 100 parts by weight of the resin matrix and about 10 parts by weight to about 100 parts by weight of the carbon fiber.

9. The camera module of claim 1, wherein the front body and the rear body are bonded to each other using ultrasonic waves.

10. The camera module of claim 9, wherein the front body and the rear body are bonded to each other by exciting them by ultrasonic waves with a frequency of about 20 kHz to about 60 kHz.

11. The camera module of claim 9, wherein a bonding portion between the front body and the rear body has a bonding strength of about 20 kgf or more.

12. The camera module of claim 1, wherein the lens unit further comprises: a lens portion comprising one or more lenses and configured to pass light therethrough; and a lens holder configured to hold the lens portion.

13. The camera module of claim 1, wherein the camera module further comprises:
an image sensor configured to convert light, which passed through the lens unit, into an electrical signal;
a printed circuit board (PCB) located in the front body and the rear body and mounted with the image sensor; and
a connector electrically connected to the PCB so as to supply power to the PCB.

* * * * *